(12) United States Patent
Whittenberger et al.

(10) Patent No.: US 10,099,198 B2
(45) Date of Patent: Oct. 16, 2018

(54) EXPANDABLE CENTER ARRANGEMENT

(71) Applicant: Johnson Matthey Public Limited Company, London (GB)

(72) Inventors: William Alan Whittenberger, Ravenna, OH (US); Joseph W. Whittenberger, Ravenna, OH (US); Frank James Podojil, III, Ravenna, OH (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/602,702

(22) Filed: May 23, 2017

(65) Prior Publication Data

US 2017/0333866 A1 Nov. 23, 2017

Related U.S. Application Data

(60) Provisional application No. 62/340,100, filed on May 23, 2016.

(51) Int. Cl.
*B01J 19/24* (2006.01)
*B01J 19/32* (2006.01)
*B01J 19/00* (2006.01)

(52) U.S. Cl.
CPC ....... *B01J 19/2415* (2013.01); *B01J 19/0013* (2013.01); *B01J 19/243* (2013.01); *B01J 19/249* (2013.01); *B01J 19/32* (2013.01); *B01J 2219/00081* (2013.01); *B01J 2219/1943* (2013.01); *B01J 2219/24* (2013.01); *B01J 2219/2408* (2013.01); *B01J 2219/3221* (2013.01)

(58) Field of Classification Search
CPC ...... B01J 19/32; B01J 19/325; B01J 19/2415; B01J 2219/32265; B01J 2219/32275; B01J 2219/3221; B01J 2219/32224
See application file for complete search history.

(56) References Cited

U.S. PATENT DOCUMENTS

| | | | |
|---|---|---|---|
| 7,906,079 B2 * | 3/2011 | Whittenberger | B01J 10/007 422/180 |
| 2003/0219362 A1 | 11/2003 | Whittenberger | |
| 2006/0019827 A1 | 1/2006 | Whittenberger | |

FOREIGN PATENT DOCUMENTS

| | | |
|---|---|---|
| DE | 102012012997 A1 | 1/2014 |
| JP | H06 343876 A | 12/1994 |
| WO | WO-2007015969 A2 | 2/2007 |
| WO | 2013151889 A1 | 10/2013 |

* cited by examiner

*Primary Examiner* — Lessanework Seifu
(74) *Attorney, Agent, or Firm* — Kevin M. Carroll

(57) ABSTRACT

An expandable center arrangement for a reactor is disclosed. The arrangement comprises an expansion tube; a center support inside the expansion tube and three or more spring elements. The spring elements are fastened to the center support and arc out to the expansion tube. A reactor is also disclosed.

15 Claims, 9 Drawing Sheets

EXPANDABLE CENTER ARRANGEMENT

FIELD OF THE INVENTION

The present invention relates to an expandable center arrangement for a reactor, to a reactor and to a method of installing an expandable center arrangement in a reactor. In particular, but not exclusively, the present invention relates to an expandable center arrangement for a stackable structured reactor, to a stackable structured reactor and to a method of installing such an arrangement in such a reactor.

BACKGROUND

Reactor components for carrying out catalytic reactions, such as those used to produce syngas or hydrogen, can generally contact reactor tubes exposed to a heat source, for example a furnace, to support reactions. In contrast, other types of reactions, such as exothermic reactions, can require a cooling source, such as a cooling jacket. The reactor tubes can be loaded with various arrangements of catalyst-coated components, such as foil-supported or structured catalysts in the form of fans, fins, coils, foams, or monoliths. In some instances, the reactor catalyst-coated components can be expandable, such as those formed from foil, for example, a fan.

To improve heat transfer and fluid flow through a reactor, the fit of foil-supported catalysts can be enhanced. In a reactor tube, expandable catalyst-coated reactor components can be positioned to increase heat transfer, such as being in contact with or in a controlled proximity to the reactor wall exposed to a heating or cooling source. Thus, it is desirable to fit reactors with accessories to promote increased heat transfer and reactor efficiency.

WO2013151889 describes an expandable center arrangement for use in a tubular reactor, such as a reformer, for enhancing heat transfer and reactor efficiency. The expandable center arrangement can include a cone being expandable in the radial direction and an expansion weight for promoting expansion of the cone. The cone and expansion weight can be slidable arranged on a center support. Expansion of the cones in the radial direction forces reactor catalyst-coated components radially outward to an outer tube that houses the reactor catalyst-coated components and expandable center arrangement. Expansion of reactor catalyst-coated components towards the outer tube promotes heat transfer for carrying out catalytic reactions.

The arrangement in WO2013151889 produces good performance, but involves relatively expensive sliding bushings and expanding cones. The cones may be expensive or have reliability issues. The push-nuts used to hold the cones and bushings in place can be awkward to install and may require a special surface on the center support. To install the system, a tool with three functions: grab, blast and push, is required. There is therefore room for improvement of the system of WO2013151889, in particular to further lower the system cost and further improve the ease of installation of the system.

Preferred embodiments of the present invention seek to overcome one or more of the above disadvantages of the prior art. In particular, preferred embodiments of the present invention seek to provide improved expandable center arrangements for reactors and improved reactors.

SUMMARY OF INVENTION

According to a first aspect of the invention, there is provided an expandable center arrangement for a reactor, the arrangement comprising: an expansion tube; a center support inside the expansion tube and three or more spring elements; the spring elements being fastened to the center support and arcing out to the expansion tube.

Such an arrangement may provide an expandable center that provides an expansive force to the structured catalyst-coated components of the reactor, while not requiring a large number of separate moving parts. The arrangement is thus advantageously straightforward to manufacture, assemble and install and may provide potential for cost savings. The spring elements are preferably resilient so as to bias the expansion tube outwardly away from the center support.

The expansion tube may be formed from tail ends of the spring elements wrapping around and overlapping each other. Thus the spring elements preferably spiral around and overlap each other. For example, the spring elements preferably have head ends fastened to the center support and tail ends overlapping to form the expansion tube. Preferably each of the tail ends extends around at least one full circumference of the expansion tube. By forming the expansion tube from the tail ends of the spring elements, the center arrangement may comprise a single structure, which may be easier to handle and install than a multi-component system. The expansion tube may be separate to the spring elements and the spring elements may press outwardly against the expansion tube. For example, the spring elements may press outwardly from the center support against the inside of the expansion tube. Such a system may be advantageous, for example, when different material properties are desirable for the spring elements and the expansion tube.

Preferably the spring elements are sheet-like elements aligned with the axial direction of the center support and the expansion tube. For example, the center support and expansion tube are preferably substantially straight with the center support (for example, a tube or rod) aligned concentrically inside the expansion tube. The spring elements preferably comprise sheets of a resilient material, such as metal, and are preferably fastened along one edge to the center support so that first opposite edges of the sheets are aligned with the center support and the longitudinal axis of the expansion tube and second opposite edges or the sheets arc out from the center support to the expansion tube. Such an arrangement may provide an expansive force across a large area of the expansion tube.

Preferably the expansion tube resists compression. That resistance may be as a result of frictional forces between layers. Preferably the expansion tube comprises at least one sheet wrapped around multiple times to form the circumference of the expansion tube. That may produce an overlapping area that provides a high degree of resistance to compression of the tube. The at least one sheet may be the tails of the spring elements. The multiple wraps may be provided by each tail being wrapped around at least one circumference of the expansion tube.

According to a second aspect of the invention, there is provided a reactor comprising: an outer tube; an expansion tube inside the outer tube; an expandable catalyst support occupying an annular space between the expansion tube and the outer tube; and three or more curved resilient spring elements arranged within the expansion tube so as to bias the expansion tube toward the outer tube.

Preferably the spring elements are mounted on a center support. The center support may be used to provide rigidity to the structure and may be used to handle the structure during installation and removal.

It may be that the expansion tube is formed from tail ends of the spring elements wrapping around and overlapping each other. It may be that the expansion tube is separate to the spring elements.

Preferably the spring elements are sheet-like elements aligned with the axial direction of the outer tube and the expansion tube.

Preferably the expansion tube comprises at least one sheet wrapped around multiple times to form the circumference of the expansion tube.

Preferable reactors of the invention, sometimes referred to as a stackable structural reactor ("SSR"), can include multiple catalyst support components arranged around or stacked on a center support, such as a central rod or mandrel, pipe, post or the like, in order to form a monolith of general annular cross section as viewed in the direction of flow of fluid through the reactor. The monolith or stacked catalyst supports can occupy all or a portion of the annular space between two concentrically arranged tubes, such as an outer tube and an inner tube. The inner tube may be referred to as an expansion tube. As described herein, various modifications and embodiments of the reactors and associated reactor components can be used in connection with expandable center arrangements to promote heat transfer and reactor efficiency.

Materials of construction for all reactor components or parts thereof, such as catalyst supports, center supports, spring elements and inner and outer tubes, as discussed herein, can include any suitable material as known in the art, for example, metal, non-ferrous metal, metal foil, steel, stainless steel, alloys, foils, non-metals such as plastics or glass, ceramic, or combinations thereof.

A reactor or outer tube having an inner wall surface and an outer wall surface, such as a reformer tube, may house reactor components, such as vertically stacked fans or monoliths, arranged around a center support. The diameter of the outer tube is preferably constant along its entire length. In the case of reformer tubes, portions of the tube can have a larger diameter and create bulges or expanded portions in the outer tube. The reactor components may be constructed to have a central opening for receiving the center support and center section components, such as an expanding center arrangement including the inner tube, such that the components can be stacked or arranged on the center support between the outer tube and the expanding center arrangement. The center support can have a length to accommodate the length of the outer tube. The center support may be continuous but is preferably formed from sections, each section being associated with an expanding center arrangement and a section of the reactor components. The center support can have a bracket, bushing, base plate or the like for providing a stop fitting so the reactor components, such as a fan or monolith, do not slide off the end of the center support. The base plate can be located at or near the bottom end of the center support and can have a shape and diameter or dimensions to permit ease of install in the outer tube. For instance, the stop plate can have a circular shape with a diameter about the same or less than the inner diameter of the outer tube.

The center support can be preloaded with any number of reactor components before being inserted into the outer tube. The components can be stacked vertically, one on top of another as shown, to form layers of reactor components, either vertically or in alternative ways such as horizontal to accommodate orientation of a reactor or certain technology requirements. Washers can be inserted between one or more reactor components (e.g., fans) as desired, for example, each fan can be separated by a washer wherein the washer creates an open space between the components. Stacked reactor components, which have a typical height in the range 8 mm to 100 mm, can be arranged vertically as desired to create a sub-assembly with height in the range 15 cm to 1.5 m. Multiple sub-assemblies can be stacked together in a reactor, for example from 1 to 60 sub-assemblies can be stacked. The stacked sub-assemblies can have a height in the range of 1 m to 20 m. Each sub-assembly may be formed on a section of center support. Once installed, the sections of center support may combine to form a continuous center support. The section of the center support may extend beyond one end of the preloaded reactor components of the sub-assembly, thus providing a protruding portion that can be gripped during installation of the sub-assembly into the outer tube. The center support section may include an open-ended hollow portion at an opposite end of the section to the protruding portion. Thus the protruding portion of one section may fit into the hollow portion of an adjacent section so that the reactor components of adjacent sub-assemblies are separated by less than the length of the protruding portion. Preferably the protruding portion of one section may fit into the hollow portion of an adjacent section so that the reactor components, including for example the washers if present, of adjacent sub-assemblies form a continuous stack.

The reactor components can be, for example, fans or monoliths, either used with or without washers. In one embodiment, the reactor components can be catalyst supports, such as fans, coils or monoliths having one or more catalyst coatings. Washers used in connection with the components can also have a catalyst coating to effectively distribute catalyst contact with the fluid flowing through the reactor. Catalytic material is known in the art and can include nickel, palladium, platinum, zirconium, rhodium, ruthenium, iridium, cobalt and oxides of aluminium, cerium, and zirconium.

The catalyst supports can be expandable in the radial direction such that the supports can be pushed outward radially to the outer tube. As arranged in the outer tube, the reactor components can occupy a portion or substantially the entire annular space between the outer tube and the inner tube. The components, when expandable and in the collapsed state, have a diameter less than the outer tube. In the expanded position, the components can be in direct contact with the outer tube or create a small gap between the outer tube and the outer diameter face of the components. The gap between the outer edge diameter face of the reactor components and the inner wall surface of the reactor tube can be at least 0.2, 0.5, 1, 2, 3, 5, 10 or 15 mm. The gap is preferably not more than 3, 6, 10, 15, 20 or 25 mm and preferably in the range of 0.5 to 6 mm, and more preferably 1 to 3 mm. The gap promotes heat transfer and forces fluid flow traveling toward the inner wall surface of the reactor wall to be directed back towards the inner portion of the reactor. Spacers, such as a washer, wire, ring, loop or the like, can be used to ensure desirable gap spacing between the outer diameter edge or face of the monoliths or fans and the inner wall surface of the reactor tube. Fluid, such as gas or liquid, to be reacted generally flows vertically, either up-flow or down-flow as desired, through the reactor tube and through each component arranged on the center support, preferably outside the inner tube. Reactor components direct fluid flow in other non-vertical directions to increase heat transfer, for example fans can direct or guide fluid flow radially (perpendicular to the overall vertical direction) towards the reactor tube wall. One or more monoliths or fans can be in contact or close proximity of the inner wall surface of the reactor tube, which effectively transfers heat from the exterior of the reactor to the reactor components and fluid contained therein for promoting endothermic catalytic reactions. For exothermic catalytic reactions, the principle of operation is the same, but heat is transferred from the reactor components and the fluid contained therein to the exterior of the reactor. While the above description has referred to vertical flow, which is typically used, the invention can also be used with horizontal (or other orientation) flow reactors. Such reactors orientations may in particular be used when structured catalyst elements are employed since such elements may be more easily retained in a horizontal geometry than, say, catalyst pellets.

At the center section of the reactor tube an expandable center arrangement can be used. The expandable center arrangement may include the inner tube, which may house the expandable center arrangement. The inner tube can be corrugated or composed of rolled metal sheet or flat sheet rolled in a cylinder such that there is an overlapping section at the point the two ends of the sheet meet. That is, the ends of the rolled sheet overlap and, as force is exerted inside the cylinder or tube, the overlapping portion slides so that the inner tube expands radially outward. For example, the inner tube can be made of a foil sheet rolled into a cylinder. Preferably the overlapping section extends at least once and preferably at least twice around the circumference of the inner tube. Thus the inner tube may be a cylinder formed from multiple windings of a sheet of material, for example foil. The inner tube may be a stand-alone article, or may be formed from the tails of the spring elements.

The spring elements provide tension to the reactor components and urge the inner tube outwards. At its outer diameter, the inner tube contacts the reactor components, such as the expandable catalyst-coated fans. Because the spring elements push radially outward against the inner tube, the inner tube can be in constant contact with the reactor components to prevent or eliminate a gap between the inner diameter of the reactor components and the outer diameter of the inner tube. Reducing or eliminating any gap spacing between the inner diameter of the reactor components and the outer diameter of the inner tube increases the amount of fluid that is directed to the outer portion of the reactor near the reactor tube wall, which can increase heat exchange and reaction efficiency. The force provided by the spring elements can also promote expansion of the reactor components against the outer tube thus maintaining the correct, small, spacing between the reactor components and the outer tube and promoting heat transfer to the fluid passing through the reactor. During operation the temperature can increase and the outer tube can creep or expand radially outward away from the reactor components and form a gap between the outer diameter face of the reactor components and the outer tube. The tendency of the spring elements to unwrap can force the reactor components outward to reduce or eliminate such a gap.

According to a third aspect of the invention there is provided a method of installing an expandable center arrangement in a reactor. Preferably the expandable center arrangement is an expandable center arrangement according to the first aspect of the invention. Preferably the installation produces a reactor according to the second aspect of the invention. Preferably the method comprises: providing an expandable center arrangement comprising an expansion tube and spring elements arranged inside the expansion tube, inserting the center arrangement into the reactor, introducing a pressurised gas into the expansion tube so as to expand the expansion tube, wherein the spring elements resist compression of the expansion tube after the pressurised gas is vented.

Preferably a center support is arranged inside the expansion tube and the spring elements are mounted on the center support. The center support advantageously increases the strength of the arrangement and provides a place for an installation tool to grip. The center support may also be useful for stacking multiple center arrangements into the reactor as the center support of one arrangement may interface with the center support of an adjacent arrangement to provide a continuous center support. In some embodiments the expansion tube is formed from tail ends of the spring elements wrapping around and overlapping each other. Preferably the spring elements are sheets of resilient material attached along one edge to the center support so that first opposite edges of the sheets are parallel to the center support and the axis of the expansion tube and second opposite edges of the sheets arc out from the center support to the expansion tube. Such an arrangement may be simple to manufacture. It may also be advantageous in that the overlapping ends of the sheets have a frictional force between them, which assists in preventing compression of the expansion tube. When the pressurised air is introduced, the air flows between the overlapping ends of the sheets and lubricates movement of the sheets relative to each other, thus permitting the expansion tube to expand both as a result of the pressurised air and the expansion force of the resilient spring elements. When the pressurised air is stopped and the pressure vents, the sheets are no longer lubricated and the frictional force returns to assist in preventing compression.

Preferably the expansion tube is separate from the spring elements. Advantageously, the expansion tube is formed from a thinner material than the spring elements. Preferably the expansion tube is formed from multiple windings of a sheet of material. It may be that the inner end of the sheet of material comprises corrugations. The corrugations may assist the passage of the air between the windings of the sheet, thus facilitating the lubrication and expansion of the expansion tube when pressurised air is introduced into the expansion tube.

Preferably the center arrangement is inserted into the reactor using a tool. Preferably the pressurised gas is introduced via the same tool. Thus the arrangement can be installed in a single operation using a single tool. Preferably the pressurised gas is introduced by blowing pressurised gas into the expansion tube. Preferably the tool grips the center support for inserting the center arrangement. The pressurised gas may, for example, be introduced via the center support, for example by blowing the gas down a hollow center support and out through holes in the center support. The pressurised gas may, for example, be introduced directly into the expansion tube, for example by blowing the gas into the end of the expansion tube.

Preferably the spring elements provide an outward biasing force to the expansion tube during the introduction of the pressurised gas. Preferably the spring elements remain in contact with the expansion tube throughout the introduction of the pressurised gas. The provision of the spring elements results in a significant advantage in the installation since there is no need for a separate step, after the pressurised gas, to lock the expansion tube into place. Instead, the spring elements are already in place at the end of the "blow" of pressurised air and the tool can be removed straight after the blow. The removal of the tool may itself vent the pressurised gas or the pressurised gas may vent in other ways. In a large reactor, with many center arrangements to install, the time savings from not needing to lock each center arrangement may be large.

Preferably the method includes placing expandable catalyst support components around the center arrangement before the arrangement is inserted into the reactor. The catalyst support components are placed around the outside of the expansion tube. Preferably the reactor comprises an outer tube, into which the expandable center arrangement and its surrounding catalyst support components are inserted. Preferably the expansion of the expansion tube forces the catalyst support components outwardly against the inner surface of the outer tube. In that way the optimal positioning of the catalyst support components may be achieved and maintained.

It will be appreciated that features described in relation to one aspect of the invention may be equally applicable in another aspect of the invention. For example, features described in relation to the expandable center arrangement of the invention, may be equally applicable to the reactor of the invention, and vice versa. As another example, features described in relation to the method of the invention, may be equally applicable to the reactor or the expandable center arrangement of the invention, and vice versa. Some features may not be applicable to, and may be excluded from, particular aspects of the invention.

DESCRIPTION OF THE DRAWINGS

Embodiments of the present invention will now be described, by way of example, and not in any limitative sense, with reference to the accompanying drawings, of which.

DETAILED DESCRIPTION

Figure 1:
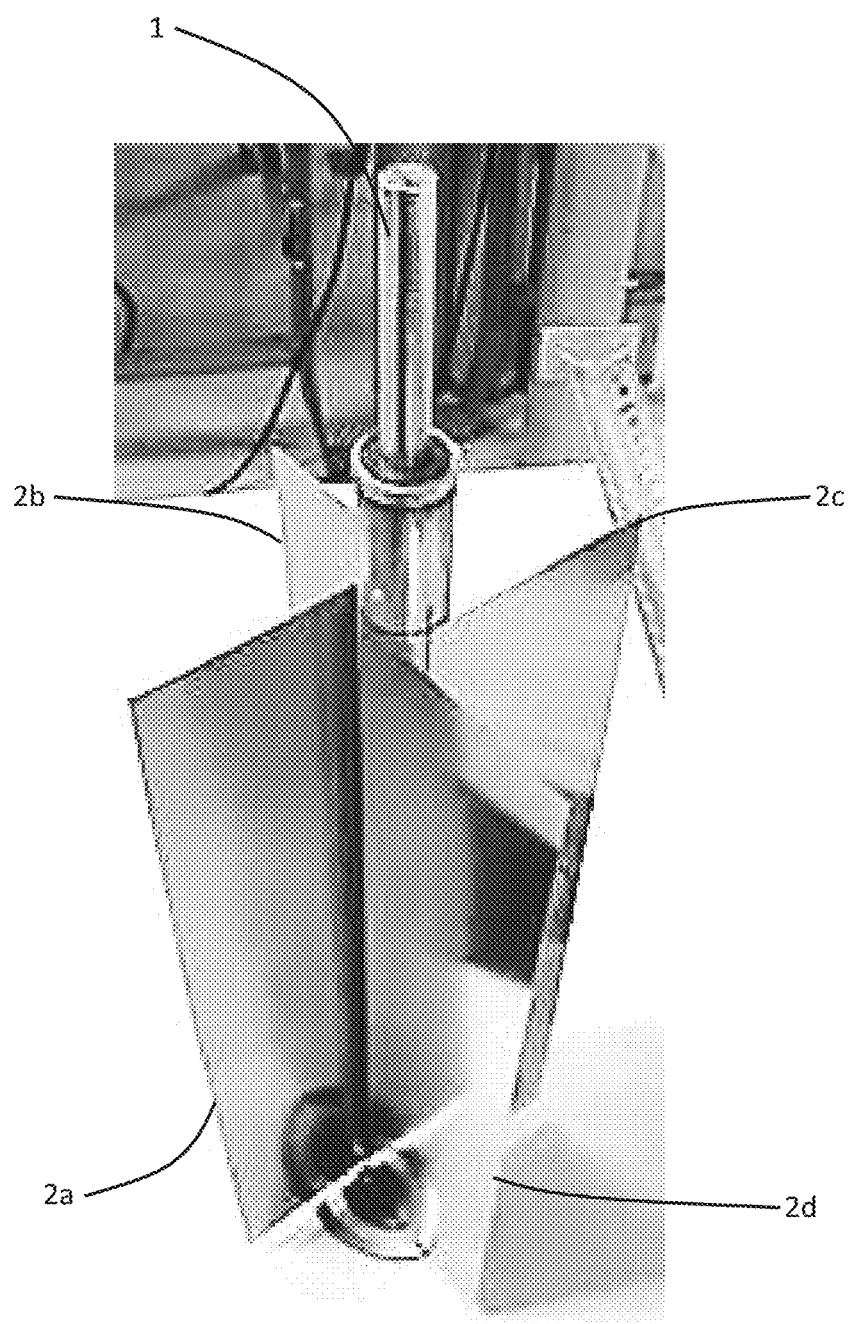
FIG. 1 is a view of part of an expandable center arrangement according to the invention.

In FIG. 1 part of an expandable center arrangement comprises a center support 1 and four spring elements 2a, 2b, 2c, and 2d connected to the center support 1. The spring elements 2a, 2b, 2c, and 2d are sheet-like elements attached to the support so that the sheet-like elements are aligned with the axial direction of the center support 1.

Figure 2:
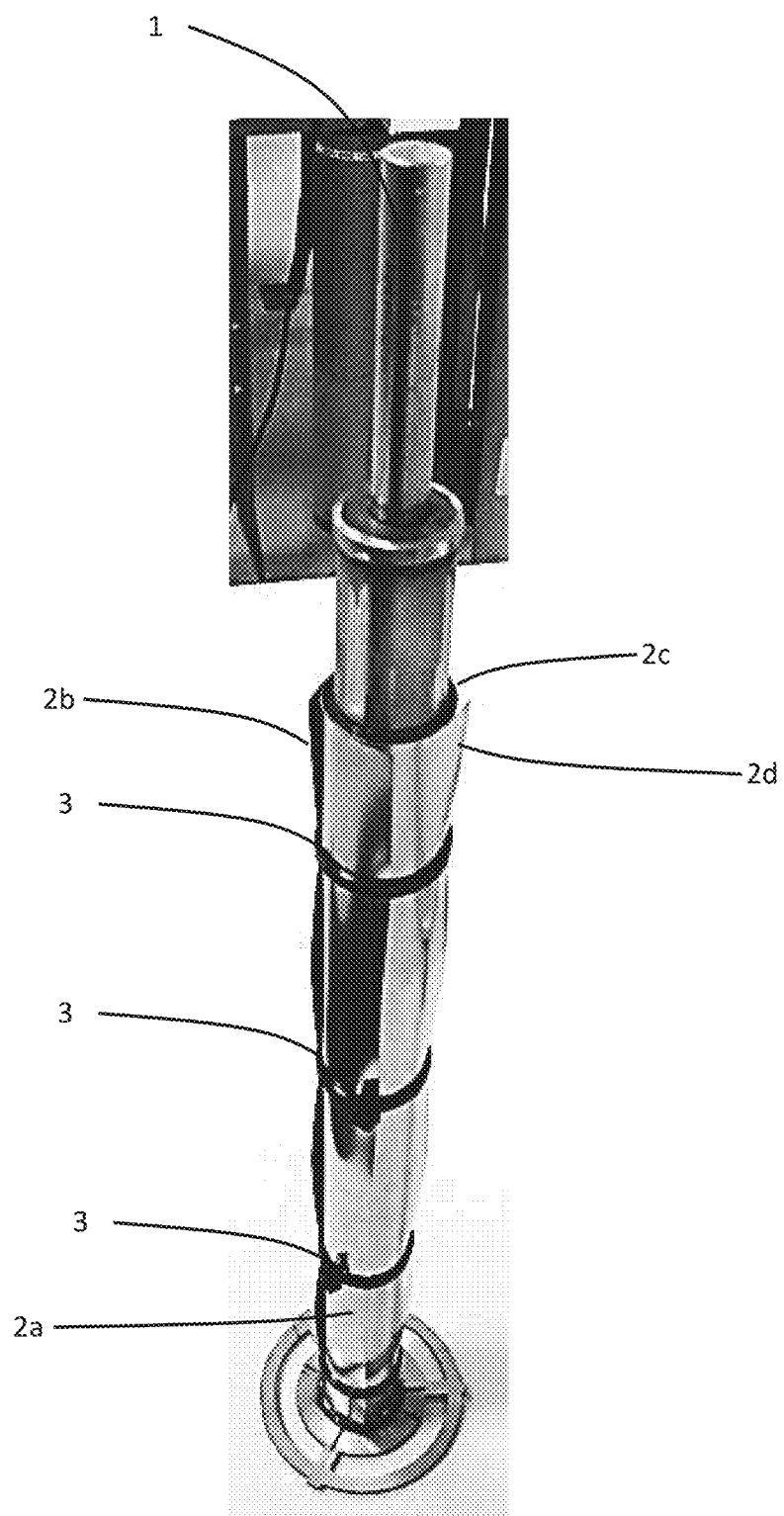
FIG. 2 is a view of the part of the expandable center arrangement of FIG. 1 with the spring elements wrapped around the center support prior to insertion into an expansion tube.

In FIG. 2, the spring elements 2a, 2b, 2c, and 2d are wrapped around the center support 1. The spring elements 2a, 2b, 2c, and 2d can be temporarily held in the wrapped position with bands 3, for example cable ties. When the bands 3 are released, the spring elements 2a, 2b, 2c, and 2d will tend to unwrap, thus creating an expansive force. Alternatively, the spring elements 2a, 2b, 2c and 2d can be held in place with a temporary restraining tube. The temporary restraining tube has a diameter a little smaller than the diameter of the expansion tube 4 (see FIG. 3). The expansion tube 4 is placed over the temporary restraining tube and the temporary restraining tube is then pulled off the spring elements 2a, 2b, 2c and 2d and out of the expansion tube 4. Like releasing the bands 3, this permits the spring elements 2a, 2b, 2c and 2d to unwrap and create an expansive force against the interior of the expansion tube 4.

Figure 3:
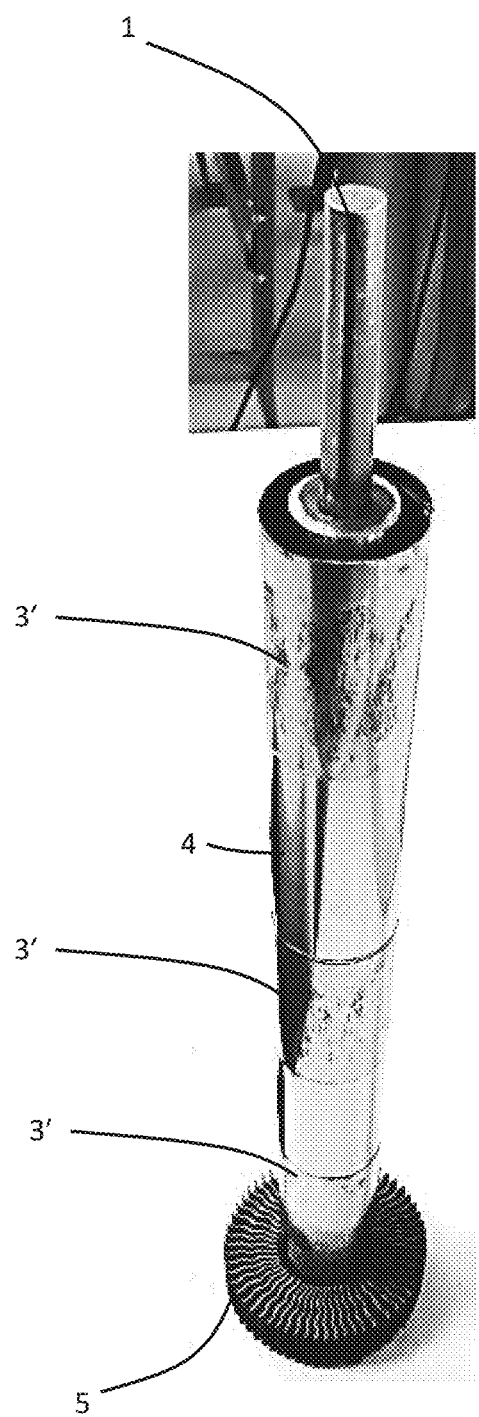
FIG. 3 is a view of an expandable center arrangement according to the invention with the part of FIGS. 1 and 2 inserted into an expansion tube.

In FIG. 3, the bands 3 have been removed and the center support 1, with the spring elements 2a, 2b, 2c, and 2d wrapped around it has been inserted into an expansion tube 4. The spring elements 2a, 2b, 2c, and 2d tend to unwrap and thus press outwardly on the expansion tube 4. Around the outside of the tube, structured catalyst-coated components 5 can be stacked. One such component 5 is shown in FIG. 3. The structured catalyst-coated components 5 are expandable and the action of the spring elements 2a, 2b, 2c, and 2d trying to unwrap presses outwardly on the expansion tube 4, which in turn presses outwardly against the structured catalyst-component 5. Foil bands 3' are wrapped around the expansion tube 4. The foil bands 3' are temporary bands that hold the expansion tube until the structured catalyst-coated components 5 are in place. As the structured catalyst-coated components 5 are stacked onto the expansion tube 4 the foil bands 3' are slid up and off the expansion tube 4.

Figure 4:
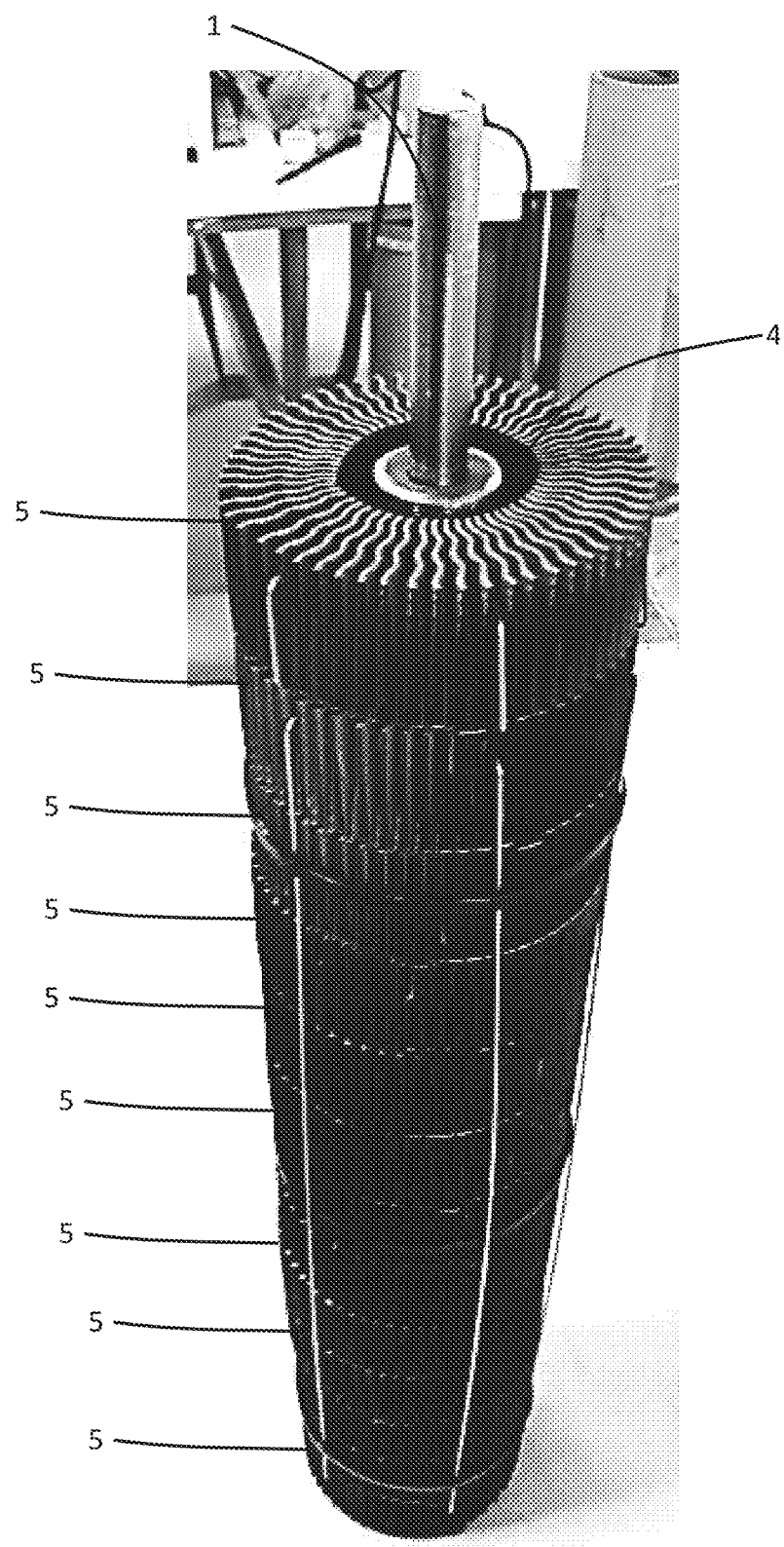
FIG. 4 is a view of the expandable center arrangement of FIG. 3 with structured catalyst components stacked around the expansion tube.

In FIG. 4, multiple structured catalyst-coated components 5 are stacked around the outside of the expansion tube 4. In use, the center arrangement with the structured catalyst-coated components 5 stacked around it is inserted into a reactor tube, not shown. The action of the spring elements 2a, 2b, 2c, and 2d trying to unwrap keeps the structured catalyst-coated components 5 pressed against the reactor tube, thus improving heat transfer from the reactor tube to the structured catalyst-coated components 5. The improved heat transfer in turn improves the reaction rate. Multiple center arrangements can be stacked on top of each other in the reactor tube. The center support 1 has a thinner portion that protrudes from the top of the center arrangement when all the structured catalyst-coated components 5 associated with that center arrangement are in place. The protruding portion can be seen in FIG. 4. The lower end of the center support 1, includes a hollow portion, or recess (not shown) into which fits the protruding portion of the center support 1 from the center arrangement below. In that way the multiple center arrangements can be stacked efficiently one on top of each other, and can be lowered into the tube, or lifted out of it, using the protruding portion of the center support 1.

Figure 5:
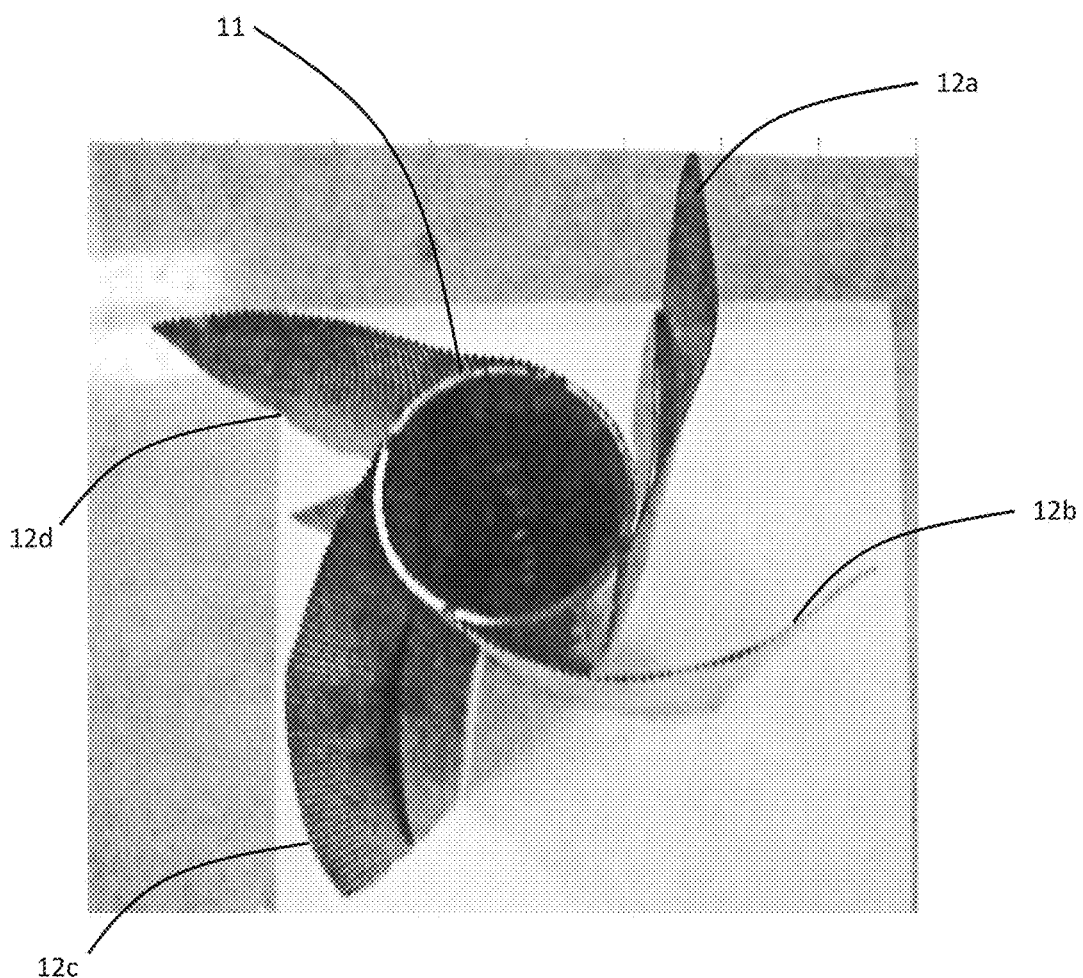
FIG. 5 is a view of an expandable center arrangement according to the invention.

In FIG. 5, a center arrangement comprises a center support 11 and four spring elements 12a, 12b, 12c, and 12d. As with the center arrangement above, the spring elements 12a, 12b, 12c, and 12d are sheet-like elements aligned with the axial direction of the center support 11. The spring elements 12a, 12b, 12c, and 12d are resilient spring elements and arc outward from the center support 11. The arc creates a spring effect so that the resilient spring elements 12a, 12b, 12c, and 12d can bias an expansion tube outwardly away from the center support 11.

Figure 6:
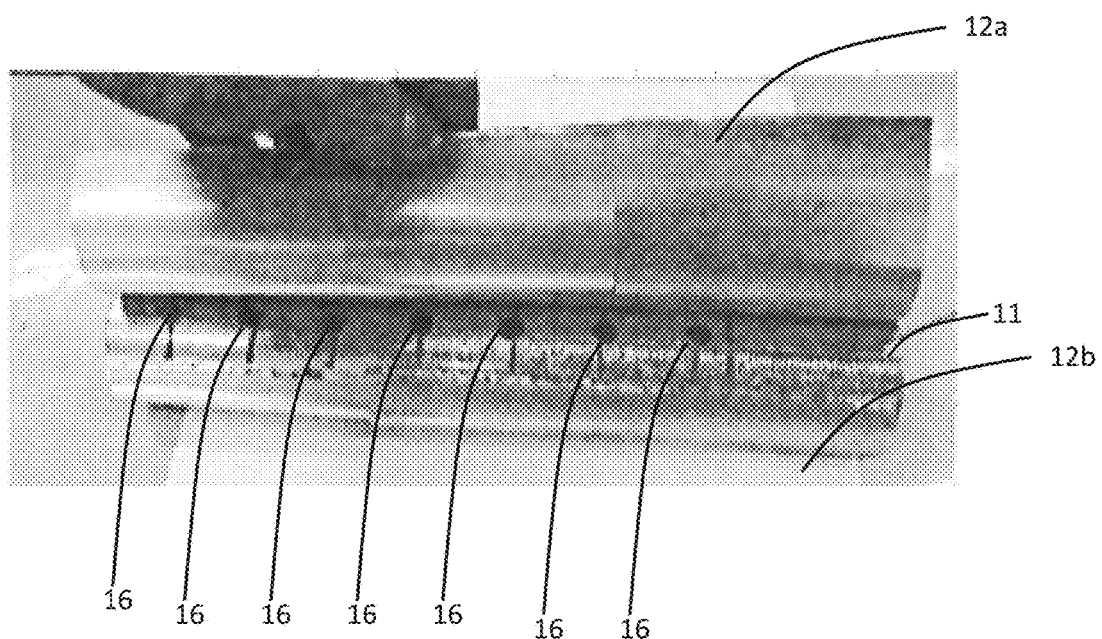
FIG. 6 is another view of the expandable center arrangement of FIG. 5.

In FIG. 6, the center support 11 comprises an array of holes 16. When the center arrangement is inserted into a reactor, with structured catalyst-coated components surrounding the center arrangement, air can be blown down the center support 11. The air will blow out through the holes 16 and force the center arrangement to expand, thus forcing the catalyst-coated structured components into intimate contact with the outer wall of the reactor tube. The spring elements 12a, 12b, 12c and 12d, which will also be expanded when the air is blown through the holes 16, will then resist compression of the center arrangement and provide a biasing force to keep the structured catalyst-coated components in intimate contact with the outer reactor tube. The blast of air passes between the spring elements 12a, 12b, 12c and 12d and lubricates them, allowing them to slide across each other and expand. When the blast finishes the spring elements 12a, 12b, 12c and 12d are no longer lubricated and the friction between them resists compression of the center arrangement. In alternative embodiments, for example where the center support 11 does not comprise holes 16, a blast of air can be provided down the cavity surrounding the center support 11 in which the spring elements 12a, 12b, 12c and 12d are located (the so-called vane cavity). That blast of air may carry out the same lubrication and expansion function as the blast through the holes 16. In that way the air is introduced directly into the expansion tube.

Figure 7:
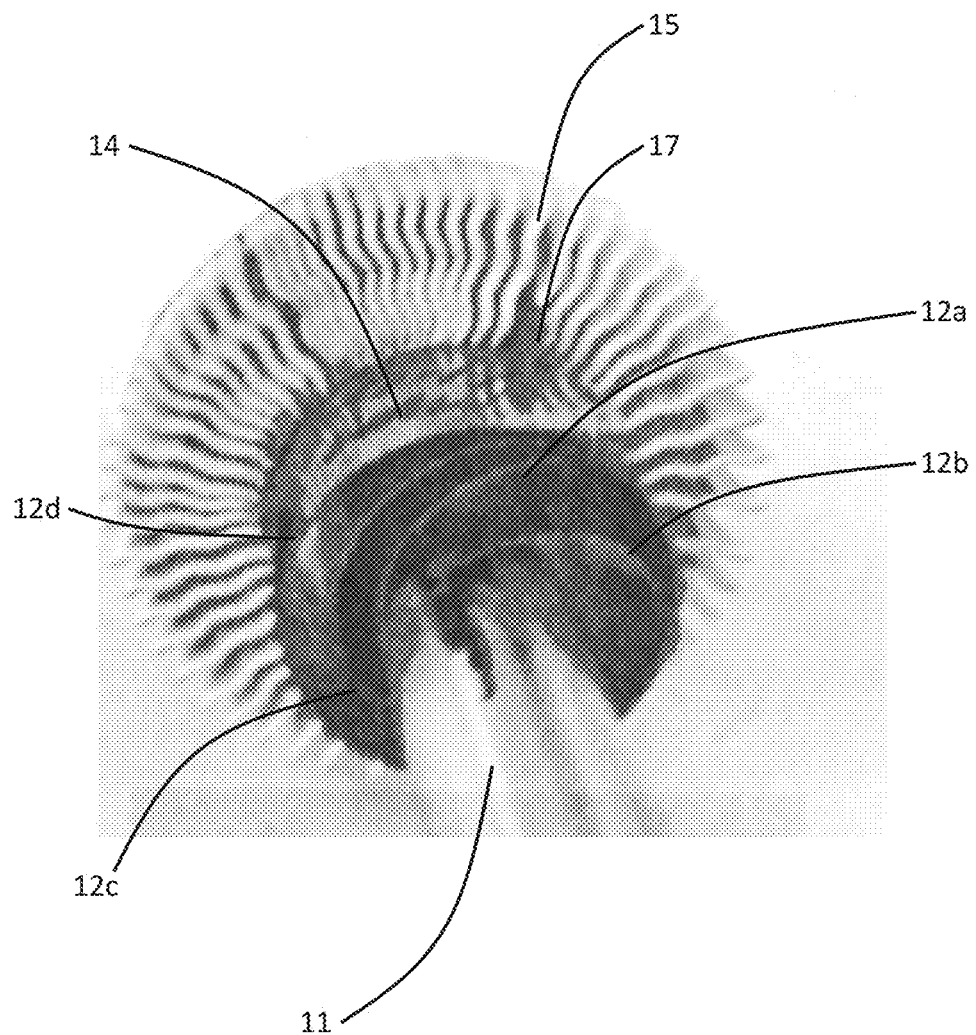
FIG. 7 is a view of an expandable center arrangement with a structured catalyst component around it.
Figure 8:
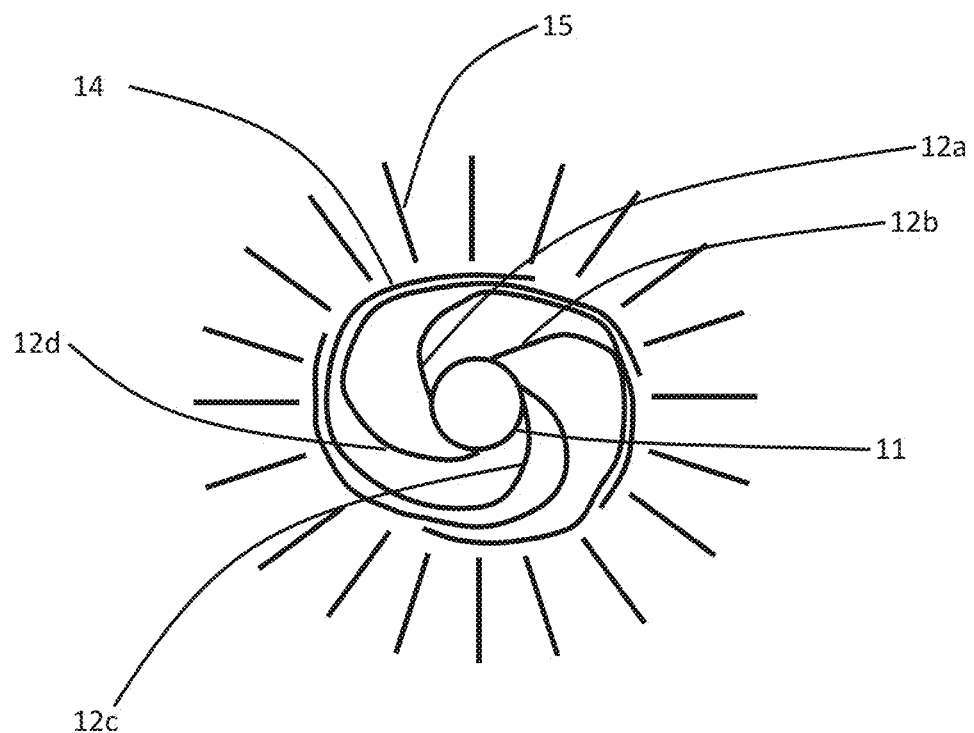
FIG. 8 is a view of the expandable center arrangement of FIGS. 5 and 6 surrounded by a structured catalyst component.

In FIGS. 7 and 8, the spring elements 12a, 12b, 12c and 12d are in their final position, with a structured catalyst-coated component 15 in place around the outside of the center arrangement. In this case, the expansion tube 14 is formed from the tail ends of the spring elements 12a, 12b, 12c and 12d wrapping around and overlapping each other. The overlapping tails create a frictional resistance to compression of the center arrangement in addition to the biasing force created by the curve of the spring elements 12a, 12b, 12c and 12d. In the embodiment of FIG. 7, the center arrangement comprises tabs 17, which insert into the structured catalyst-coated component 15. Thus twisting the center support 11 relative to the structured catalyst-coated components 15 unwinds the spring elements 12a, 12b, 12c and 12d and expands the expansion tube 14 and the structured catalyst-coated component 15.

Figure 9:
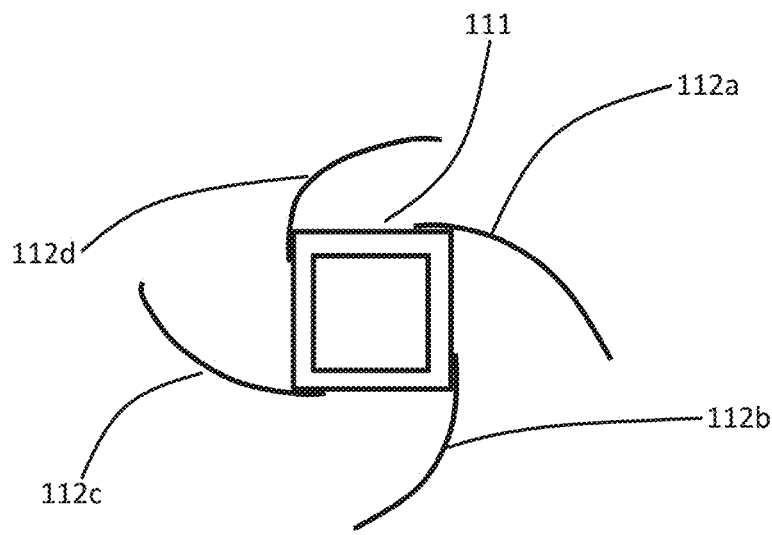
FIG. 9 is a view of an expandable center arrangement according to the invention.

In FIG. 9 a center arrangement includes a center support 111 and spring elements 112a, 112b, 112c and 112d arcing out from the center support 111. In this embodiment the center support 111 is a square box section support. The spring elements 12a, 12b, 12c and 12d are welded onto the center support 111 in the region of the corners of the box section. While the spring elements may also be welded to the center supports 1 and 11 above, the use of the square box section center support 111 with the spring elements 12a, 12b, 12c and 12d welded in the regions of the corners may result in a robust arrangement that is easy to manufacture.

Figure 10:
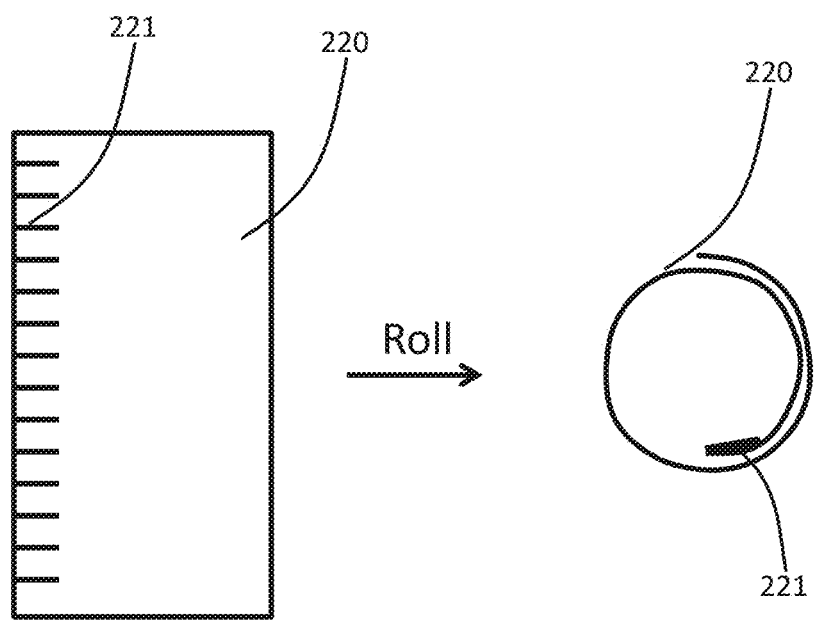
FIG. 10 is a view of a construction of an expansion tube.

In FIG. 10, an expansion tube is formed from a sheet of material 220, for example steel. The sheet 220 has corrugations 221 along an edge. The sheet 220 is rolled into a cylinder, with the corrugations 221 at an inner edge. When pressurised air, or another gas, is introduced into the tube, the corrugations 221 facilitate the passage of the air between the layers of the sheet 220. That lubricates the layers so that the tube can expand.

The operation of the center arrangement is similar for all of the above embodiments. The center arrangement is assembled by wrapping the spring elements 2, 12, 112 around the center support 1, 11, 111. If the expansion tube 4 is a separate tube, the center arrangement is inserted into the expansion tube 4. In a typical installation process the spring elements 2, 12, 112 are tightly wound around the center support and inserted using considerable force into a temporary restraining tube. The expansion tube 4 is slipped over the temporary restraining tube and the temporary tube is then pulled off the spring elements 2, 12, 112 and out of the expansion tube 4. The structured catalyst-coated components 5, 15 are stacked around the outside of the expansion tube 4, 14 to create a sub-assembly and the sub-assembly is inserted into the reactor tube. Preferably air is blown down the center support 1, 11, 111 to force the center arrangement and the structured catalyst-coated components 5, 15 to expand to press into intimate contact with the reactor tube. The air may also be blown down the vane cavity. The air can be blown using a tool which fits onto a protruding portion of the center support 1, 11, 111. The tool can be the same tool that is used to grip the center support 1, 11, 111 while lowering the sub-assembly into the reactor tube. Once the air has been blown, the outward biasing force resulting from the arc of the spring elements 2, 12, 112 and the frictional force in the overlapping layers of the expansion tube 4, 14, combine to resist compression of the center arrangement and to urge the structured catalyst-coated components 5, 15 into continuing close contact with the reactor outer tube. The center arrangement can also be expanded by twisting on the center support 11, particularly in embodiments where the expansion tube 14 is formed from overlapping ends of the spring elements 12a, 12b, 12c and 12d, with tabs 17 inserted into the structured catalyst-coated components 15.

It will be appreciated by persons skilled in the art that the above embodiments have been described by way of example only, and not in any limitative sense, and that various alterations and modifications are possible without departure from the scope of the invention as defined by the appended claims. For example, instead of 4 there may be 3, 5 or more spring elements.

The invention claimed is:

1. An expandable center arrangement for a reactor, the arrangement comprising: an expansion tube; a center support inside the expansion tube and three or more spring elements; the spring elements being fastened to the center support and arcing out to the expansion tube.

2. An expandable center arrangement according to claim 1, wherein the expansion tube is formed from tail ends of the spring elements spiraling around and overlapping each other.

3. An expandable center arrangement according to claim 2, wherein each of the tail ends extends around at least one full circumference of the expansion tube.

4. An expandable center arrangement according to claim 1, wherein the expansion tube is separate to the spring elements and the spring elements press outwardly against the expansion tube.

5. An expandable center arrangement according to claim 1, wherein the spring elements are resilient so as to bias the expansion tube outwardly away from the center support.

6. An expandable center arrangement according to claim 1, wherein the spring elements are sheet-like elements aligned with the axial direction of the center support and the expansion tube.

7. An expandable center arrangement according to claim 1, wherein the expansion tube comprises at least one sheet wrapped around multiple times to form the circumference of the expansion tube.

8. An expandable center arrangement according to claim 6, wherein the at least one sheet comprises corrugations at an inner end.

9. An expandable center arrangement according to claim 1, wherein the center support comprises at least one hole to allow air blown down the center support to lubricate the spring elements.

10. A reactor comprising: an outer tube; an expansion tube inside the outer tube; an expandable catalyst support occupying an annular space between the expansion tube and the outer tube; and three or more curved resilient spring elements arranged within the expansion tube so as to bias the expansion tube toward the outer tube, wherein:
   (a) the expansion tube is formed from tail ends of the spring elements spiraling around and overlapping each other;
   (b) the expansion tube comprises at least one sheet wrapped around multiple times to form the circumference of the expansion tube; or
   (c) the spring elements are sheet-like elements aligned with the axial direction of the outer tube and the expansion tube.

11. A reactor according to claim 9, wherein the spring elements are mounted on a center support.

12. A reactor according to claim 9, wherein the expansion tube is separate to the spring elements.

13. A method of installing an expandable center arrangement in a reactor, the method comprising: providing an expandable center arrangement comprising an expansion tube and spring elements arranged inside the expansion tube, inserting the center arrangement into the reactor, introducing a pressurised gas into the expansion tube so as to expand the expansion tube, wherein the spring elements resist compression of the expansion tube after the pressurised gas is vented, wherein the center arrangement is inserted into the reactor using a tool and the pressurised gas is introduced via the same tool.

14. A method according to claim 13, wherein the spring elements provide an outward biasing force to the expansion tube during the introduction of the pressurised gas.

15. A method according to claim 13, wherein the spring elements remain in contact with the expansion tube throughout the introduction of the pressurised gas.

* * * * *